(12) United States Patent
Johnson

(10) Patent No.: US 7,206,689 B1
(45) Date of Patent: Apr. 17, 2007

(54) METHOD FOR OPTIMIZING FUEL CONSUMPTION IN A MACHINE POWERED BY AN INTERNAL COMBUSTION ENGINE

(75) Inventor: Thomas Merle Johnson, Dike, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/358,301

(22) Filed: Feb. 20, 2006

(51) Int. Cl.
*G06F 19/00* (2006.01)
*F02M 51/00* (2006.01)

(52) U.S. Cl. .................. 701/103; 701/55; 701/123

(58) Field of Classification Search .............. 701/103, 701/104, 105, 51, 55, 64, 123; 122/478, 122/480
See application file for complete search history.

(56) References Cited

U.S. PATENT DOCUMENTS

| | | | |
|---|---|---|---|
| 6,151,549 A * | 11/2000 | Andrews et al. | 701/115 |
| 6,387,011 B1 | 5/2002 | Bellinger | |
| 6,694,806 B2 | 2/2004 | Kumagai et al. | |
| 6,985,804 B2 * | 1/2006 | Minami | 701/64 |
| 7,076,356 B2 * | 7/2006 | Hubbard et al. | 701/55 |
| 2003/0216847 A1 | 11/2003 | Bellinger | |
| 2004/0002806 A1 | 1/2004 | Bellinger | |
| 2004/0148084 A1 | 7/2004 | Minami | |
| 2005/0080539 A1 | 4/2005 | Hubbard et al. | |

FOREIGN PATENT DOCUMENTS

JP        2002-4938 A  *  1/2002

* cited by examiner

Primary Examiner—Hieu T. Vo

(57) ABSTRACT

A method for optimizing fuel consumption in a machine powered by an internal combustion engine includes providing a fuel economy map associated at least in part with the internal combustion engine, the fuel economy map defining a fuel economy at a plurality of operating points of the internal combustion engine; determining a reserve need associated with the machine; determining an available reserve of the internal combustion engine for the plurality of operating points; identifying each operating point of the plurality of operating points having an acceptable reserve, the acceptable reserve being the available reserve that satisfies the reserve need; evaluating the fuel economy for the each operating point; and defining an output value for the each operating point based on the fuel economy and the acceptable reserve.

28 Claims, 11 Drawing Sheets

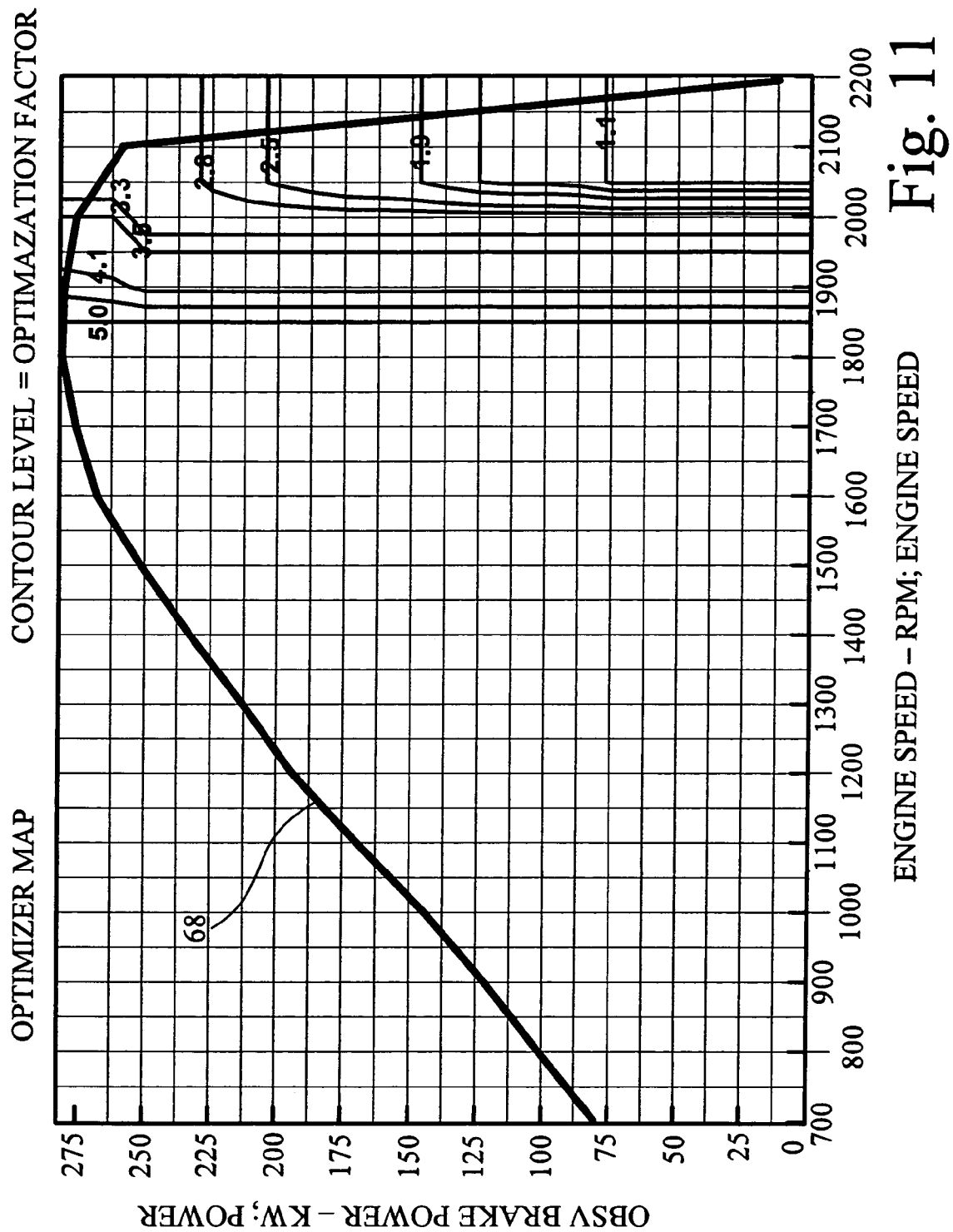

METHOD FOR OPTIMIZING FUEL CONSUMPTION IN A MACHINE POWERED BY AN INTERNAL COMBUSTION ENGINE

FIELD OF THE INVENTION

The present invention relates to a machine powered by an internal combustion engine, and more particularly, to a method for optimizing fuel consumption in a machine powered by an internal combustion engine.

BACKGROUND OF THE INVENTION

Various machines powered by internal combustion engines are employed in the agriculture, construction, and other industries, for which efficient operation is sought, e.g., fuel economy. Thus, such machines are operated in such a manner so as to strive for acceptable fuel economy.

However, during operation of such machines, operating loads may vary, for example, due to terrain changes, encountering mud, crop density changes, and the like, which may result in adverse effects upon the machine, such as undesirable changes in engine and/or machine output, the engine bogging down, inconsistent operation of the machine, changes in fuel consumption, etc., due to the varying load.

Hence, it is desirable to provide an improved method for optimizing fuel consumption in a machine powered by an internal combustion engine, while maintaining a reserve power.

SUMMARY OF THE INVENTION

The present invention provides a method for optimizing fuel consumption in a machine powered by an internal combustion engine, while maintaining a reserve power.

The invention, in one form thereof, is directed to a method for optimizing fuel consumption in a machine powered by an internal combustion engine, comprising: providing a fuel economy map associated at least in part with the internal combustion engine, the fuel economy map defining a fuel economy at a plurality of operating points of the internal combustion engine; determining a reserve need associated with the machine; determining an available reserve of the internal combustion engine for the plurality of operating points; identifying each operating point of the plurality of operating points having an acceptable reserve, the acceptable reserve being the available reserve that satisfies the reserve need; evaluating the fuel economy for the each operating point; and defining an output value for the each operating point based on the fuel economy and the acceptable reserve.

The invention, in another form thereof, is directed to a method for optimizing fuel consumption in a machine powered by an internal combustion engine, comprising: providing a fuel economy map associated at least in part with the internal combustion engine, the fuel economy map defining a fuel economy at a plurality of operating points of the internal combustion engine; establishing a table having a plurality of entries corresponding to the plurality of operating points; assigning the plurality of entries a first output value; overlaying the fuel economy map with the table; determining a reserve need associated with the machine; determining an available reserve of the internal combustion engine for each operating point of the plurality of operating points; identifying each first operating point of the plurality of operating points having an acceptable reserve, the acceptable reserve being the available reserve that satisfies the reserve need; reassigning all entries of the plurality of entries corresponding to each second operating point not having the acceptable reserve a second output value representing an insufficient reserve; evaluating the fuel economy for the each operating point; and reassigning all entries of the plurality of entries corresponding to each third operating point having suboptimal fuel economy a third output value representing a suboptimal fuel economy.

BRIEF DESCRIPTION OF THE DRAWINGS

FIG. 11 is a graphical representation of another optimizer map constructed in accordance with the embodiment of FIG. 7.

DETAILED DESCRIPTION OF THE INVENTION

Figure 1:
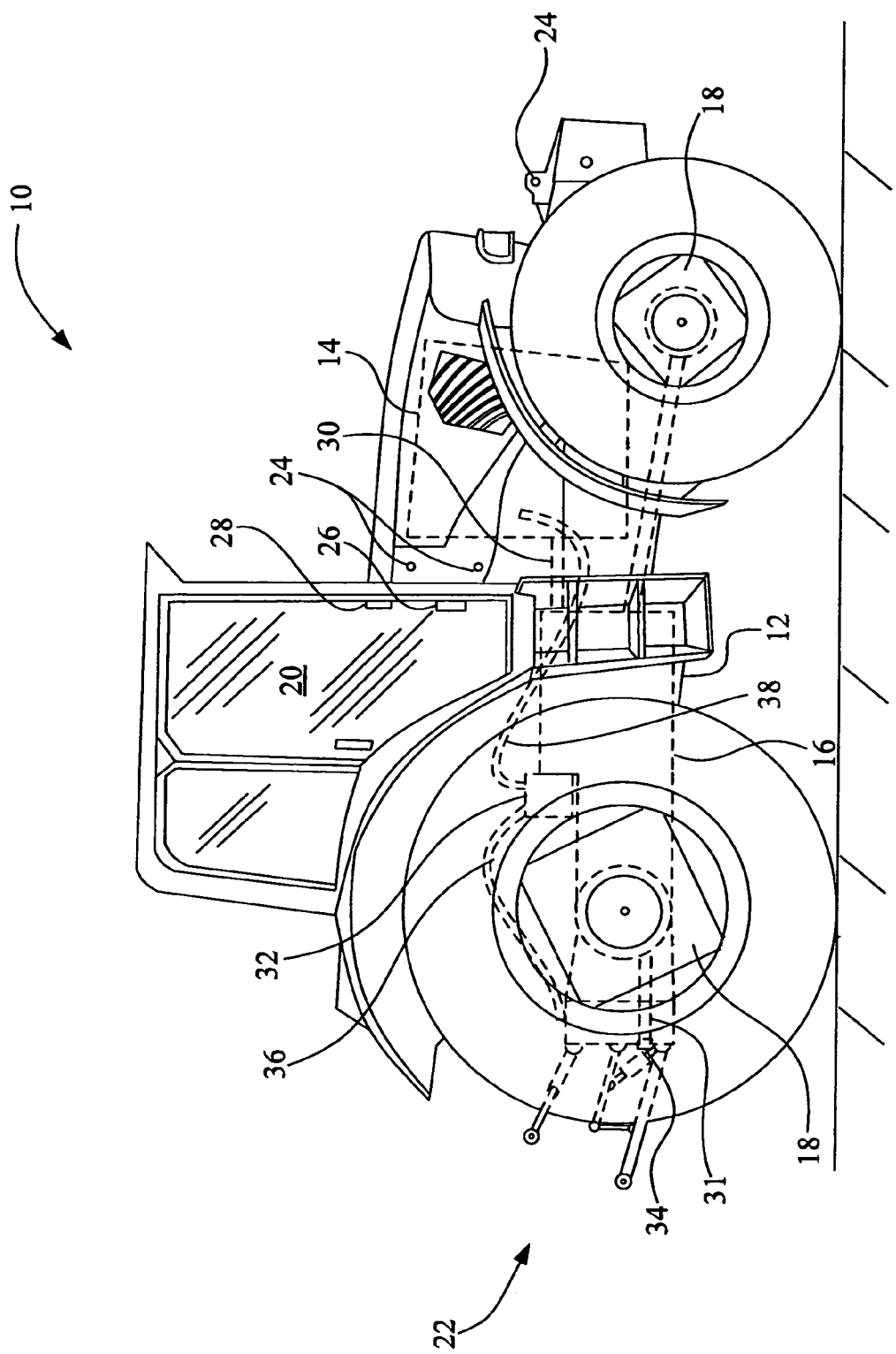
FIG. 1 is a diagrammatic depiction of a machine employed in accordance with an embodiment of the present invention

Referring now to FIG. 1, there is shown a work machine 10 in accordance with an embodiment of the present invention, in the form of a tractor. Although the invention is being described as being incorporated into a tractor, it is contemplated that the present invention may be used with other types of work machines, including agricultural machines, construction machines, generator sets, and other machines powered by an internal combustion engine for which a reserve power capability may employed to overcome a varying operating load causing a varying power demand from the machine.

Machine 10 includes a supporting structure 12, such as a frame. Coupled to supporting structure 12 are an internal combustion engine 14 coupled to a transmission 16, a propulsion system 18 coupled to transmission 16, and a cab 20 for the operator of machine 10. Also coupled to supporting structure 12 is a rear attachment 22, such as a 3 point hitch, and a forward attachment 24, such as for mounting a frame-mounted implement, e.g., a front end loader. Each of rear attachment 22 and forward attachment 24 are employed for attaching various implements at the discretion of the operator of machine 10, such as agricultural and construction implements, for example, a plow, a disk, a front end loader attachment, a backhoe attachment, etc. In addition, as set forth below, each of rear attachment 22 and forward attachment 24 provide power for operating the attached implement(s).

Machine 10 also includes an electrical control unit 26 for controlling various machine functions, including controlling engine 14 and transmission 16. In the present embodiment, control unit 26 is depicted as residing in cab 20. Control unit 26 may receive input from the operator for operating machine 10 and/or engine 14 via levers, switches, etc., known in the art. Machine 10 employs an operator display 28 communicatively coupled to control unit 26 for providing feedback to the operator of machine 10.

Engine 14 and transmission 16 are coupled by an output shaft 30 for transmitting shaft power from engine 14 to transmission 16. A hydraulic pump 32 driven by engine 14 supplies machine 10 with hydraulic power, and a power take-off shaft (PTO) 31 driven by engine 14 extends to rear attachment 22, terminating with a coupling 34 for providing power to an attachment affixed to rear attachment 22.

Propulsion system 18 is powered by engine 14 and transmission 16, and provides for both tractive effort and steering of machine 10 via gearboxes, driveshafts, and differentials (not shown).

Hydraulic lines 36 are coupled to hydraulic pump 32, and extend to near rear attachment 22 for providing hydraulic power to an implement affixed to rear attachment 22. Hydraulic lines 38 are also coupled to hydraulic pump 32, and extend near to forward attachment 24 for providing hydraulic power to an implement affixed to forward attachment 24.

For many engine 14 applications, it is desirable to maintain an amount of power in reserve that can be utilized for momentary increases in power demand. However, previous methods and systems did not account for this need; which results in the engine being driven to operate in a condition where performance is sacrificed. Embodiments of the present invention method take into account the need to maintain an amount of reserve power along with good fuel economy and provide feedback that allows the operator to run the machine 10 at the best combination of both, which is referred to herein as an 'optimized' engine 14 operating condition for the given power level supplied by engine 14. Hence, embodiments of the present invention may result in lower operating costs without loss of performance of machine 10 because of the fuel savings.

An 'optimized' operating point provides the best (optimal) fuel consumption available for a given power output, while maintaining an adequate reserve at the optimized operating point for the given application of machine 10 and/or implements being powered by machine 10. One optimal engine 14 operating speed exists for every power output level within the operating envelope of machine 10. In an embodiment of the present invention, the adequate reserve may be in the form of reserve power, e.g., for implements that are mechanically powered via PTO shaft 31. In another embodiment, the adequate reserve may be in the form of reserve speed, e.g., engine 14 speed capability above a current engine speed, for implements that are hydraulically actuated via hydraulic pump 32. Embodiments of the present invention are described with respect to brake specific fuel consumption (BSFC) for the sake of convenience, although any measure of fuel efficiency may be employed without departing from the scope of the present invention.

One embodiment of the present invention provides a method to define an optimized operating state for an engine 14 application for every power level that engine 14 and/or machine 10 is capable of running at. Another embodiment of the present invention provides a method to define the optimized operating state for engine 14 and/or machine 10 applications that do not allow operator control of engine speed. Yet another embodiment of the present invention includes storing the information into engine/vehicle control unit 26 and displaying the information to the operator.

Figure 2:
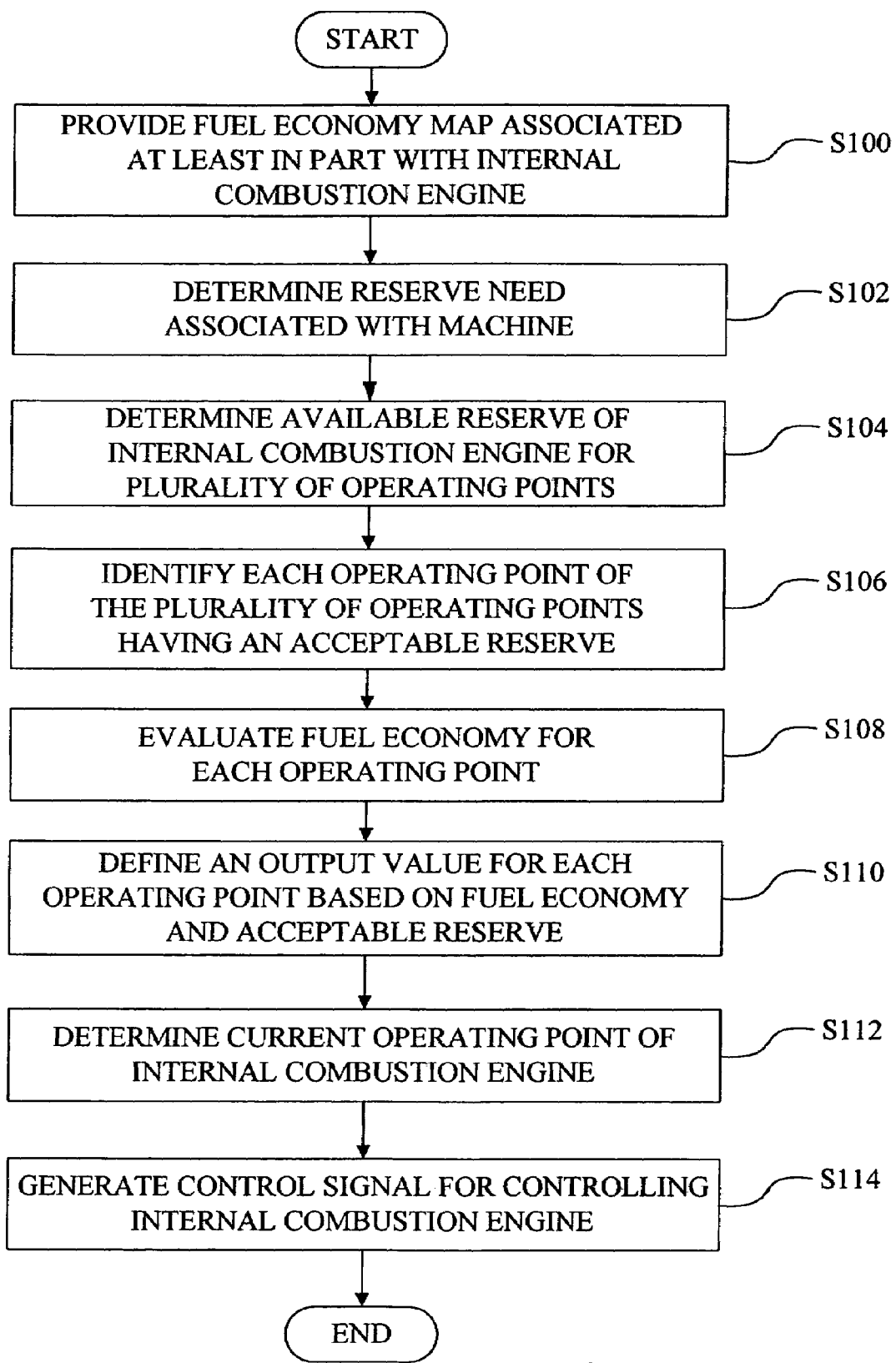
FIG. 2 is a flowchart generally depicting a method for optimizing fuel consumption in a machine powered by an internal combustion engine in accordance with an embodiment of the present invention.

Referring now to FIG. 2, a method for optimizing fuel consumption in a machine, such as machine 10, powered by an internal combustion engine, such as engine 14, in accordance with an embodiment of the present invention is generally depicted in the form of a flowchart.

At step S100, a fuel economy map 40 (FIG. 3) associated at least in part with engine 14 is provided. Fuel economy map 40 defines a fuel economy at a plurality of operating points 42 of engine 14 distributed throughout the operating range of engine 14.

Figure 3:
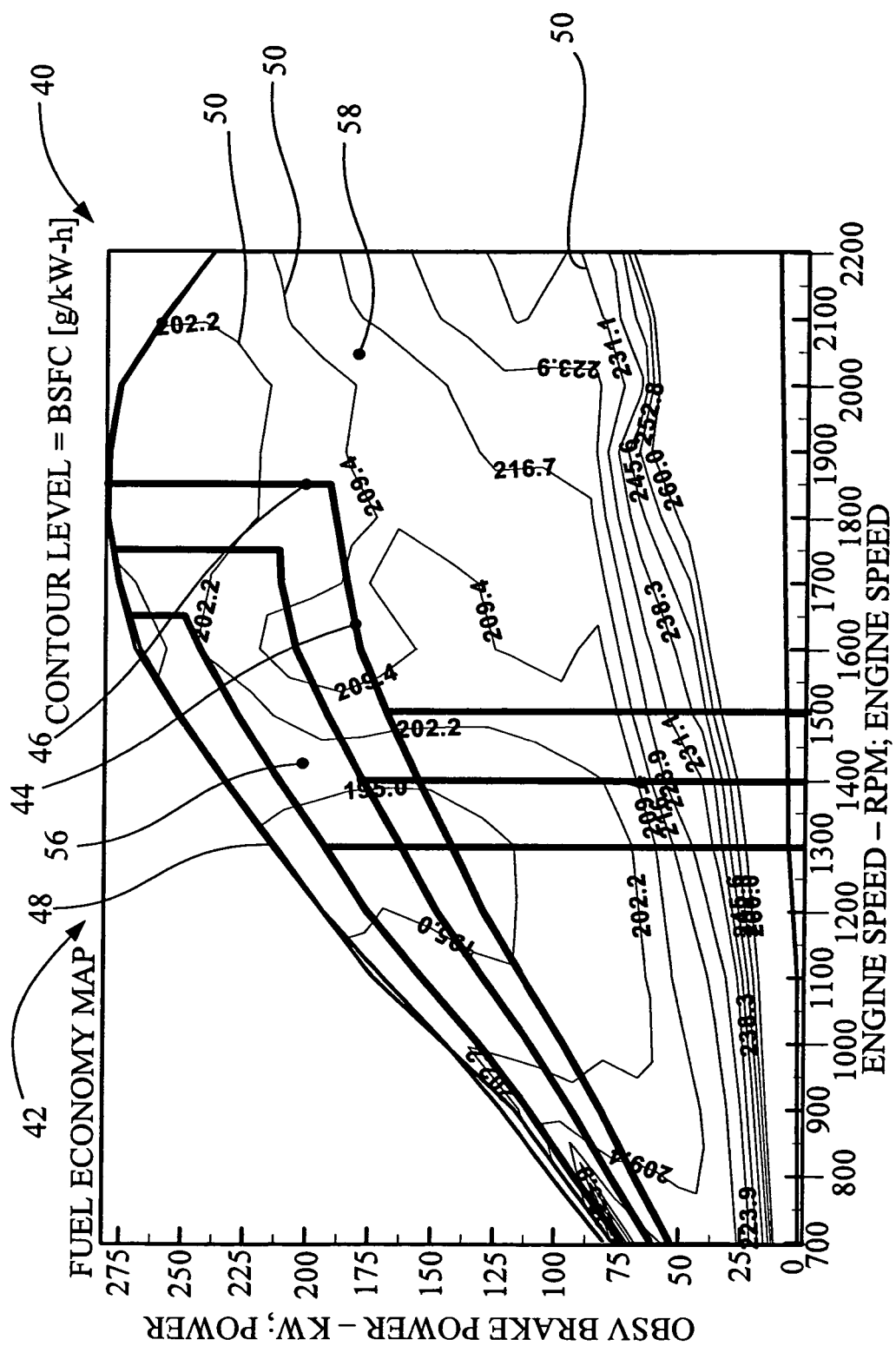
FIG. 3 is a graphical representation of a fuel economy map employed in accordance with the embodiment of FIG. 2.

For example, referring now to FIG. 3, fuel economy map 40 is depicted, along with two operating points 44 and 46 of plurality of operating points 42. In the present embodiment, a power curve 48 of engine 14 is set forth, having engine 14 power output as the ordinate, and engine 14 operating speed as the abscissa. Fuel economy map 40 also displays lines of constant BSFC 50. As depicted, operating point 44 has a power output of approximately 182 kW at approximately 1650 RPM, and a BSFC of approximately 210 g/kW-h. Operating point 46 has a power output of approximately 203 kW at approximately 1800 RPM, and a BSFC of approximately 205 g/kW-h.

Referring again to FIG. 2, step S102 includes determining a reserve need associated with machine 10. In the present embodiment, the reserve need is a reserve power need, e.g., for implements powered via PTO shaft 31 power. In another embodiment, the reserve need is a reserve engine 14 speed need, e.g., for hydraulically actuated implements powered by machine 10. In yet another embodiment, the reserve need may be a combination of a reserve power need and a reserve speed need.

The reserve need is determined empirically in the present embodiment, e.g., using readily obtained experimental test data, but the present invention is not so limited. Rather, the reserve need may be determined in any fashion, e.g., using analytical software tools, without departing from the scope of the present invention.

At step S104, an available reserve of engine 14 is defined for plurality of operating points 42 of engine 14. In the present embodiment, the available reserve is determined for every operating point of plurality of operating points 42. In another embodiment, plurality of operating points 42 may be only those operating points at which engine 14 is configured to operate in machine 10, for example, where the operator has no direct control over engine 14 output, such as where engine 14 operates only along a torque curve and a governor curve of engine 14.

For embodiments where the reserve need is a reserve power need, such as the present embodiment, the available reserve is an available reserve power of engine 14. Conversely, for embodiments where the reserve need is a reserve engine 14 speed need, the available reserve is an available reserve engine 14 speed capability. For embodiments where the reserve need is a combination of a reserve engine 14 power need and a reserve engine 14 speed need, the available reserve is an available reserve power of engine 14 in combination with an available reserve engine 14 speed capability.

At step S106, each operating point of plurality of operating points 42 having an acceptable reserve is identified. An acceptable reserve is an available reserve that satisfies the reserve need at each particular operating point, i.e., that meets or exceeds the reserve need for the operating point.

For embodiments where the reserve need is a reserve power need, such as the present embodiment, the acceptable reserve is available reserve power that satisfies the reserve power need. Conversely, for embodiments where the reserve need is a reserve engine 14 speed need, the acceptable reserve is the available reserve engine speed that satisfies the reserve engine speed need.

At step S108, fuel economy is evaluated for each operating point.

At step S110, an output value for each operating point is defined, based on the fuel economy and the acceptable reserve at each particular operating point. In the present embodiment, the acceptable reserve is a range of reserve values, and the output value varies based on the location of each operating point within the range of reserve values and on the fuel economy.

For example, if a current operating point, i.e., the operating point of engine 14 during the use of machine 10, has an acceptable reserve, and has optimum fuel economy, it is an optimized operating point, and the corresponding output value would indicate that no engine and/or transmission changes are necessary.

On the other hand, if the current operating point has an available reserve that does not satisfy the reserve need by a nominal amount, even with good fuel economy, the corresponding output value would indicate that nominal engine speed and/or transmission changes are necessary to increase engine 14 speed to reach an optimized operating point. The engine 14 and/or transmission 16 changes are one or both of changing the engine speed by controlling engine 14 to change it's speed in the appropriate direction, and changing transmission 16 gear ratios to change the engine 14 speed in the appropriate direction, to reach an optimized operating point.

However, if the current operating point has an available reserve that is substantially less than the reserve need, the corresponding output value would indicate that substantial engine or transmission changes are necessary to change engine speed to reach an optimized operating point.

If the current operating point has an available reserve that satisfies the reserve need, but the fuel economy is suboptimal by a nominal amount, i.e., less than the best fuel economy for the current power demand placed on engine 14, but not greatly so, the corresponding output value would indicate that a nominal engine 14 and/or transmission 16 changes are necessary to change engine 14 speed to reach an optimized operating point.

Conversely, if the current operating point has an available reserve that satisfies the reserve need, but the fuel economy is suboptimal by a substantial amount, i.e., substantially less than the best fuel economy for the current power demand placed on engine 14, the corresponding output value would indicate that substantial engine 14 and/or transmission 16 changes are necessary to change engine 14 speed to reach an optimized operating point.

For operating points where the available reserve does not satisfy the reserve need and where the fuel economy is suboptimal, the corresponding output value would similarly indicate the degree of engine 14 and/or transmission changes to the operating point of engine 14 and/or transmission 16 necessary to change engine 14 speed to reach an optimized operating point.

In the present embodiment, the output value for each operating point is stored in control unit 26.

At step S112, during the operation of machine 10, control unit 26 executes programmed instructions to determine the current operating point of engine 14. In the present embodiment, the programmed instructions take the form of a conventional computer program residing in software, firmware, and/or hardware components of control unit 26.

At step S114, a control signal for controlling engine 14 is generated using the output value corresponding to the current operating point. In the present embodiment, control unit 26 executes programmed instructions to generate the control signal for controlling engine 14 using the output value corresponding to the current operating point. The control signal is configured to operate engine 14 at a minimum specific fuel consumption while maintaining the acceptable reserve, since the control signal is based on an output value representative of changes to the operating point of engine 14 and/or transmission 16 as required to reach an optimized operating point.

In the present embodiment, the control signal is used to prompt the operator of machine 10 to change current operating point as required to reach a corresponding optimized operating point.

Figure 4:
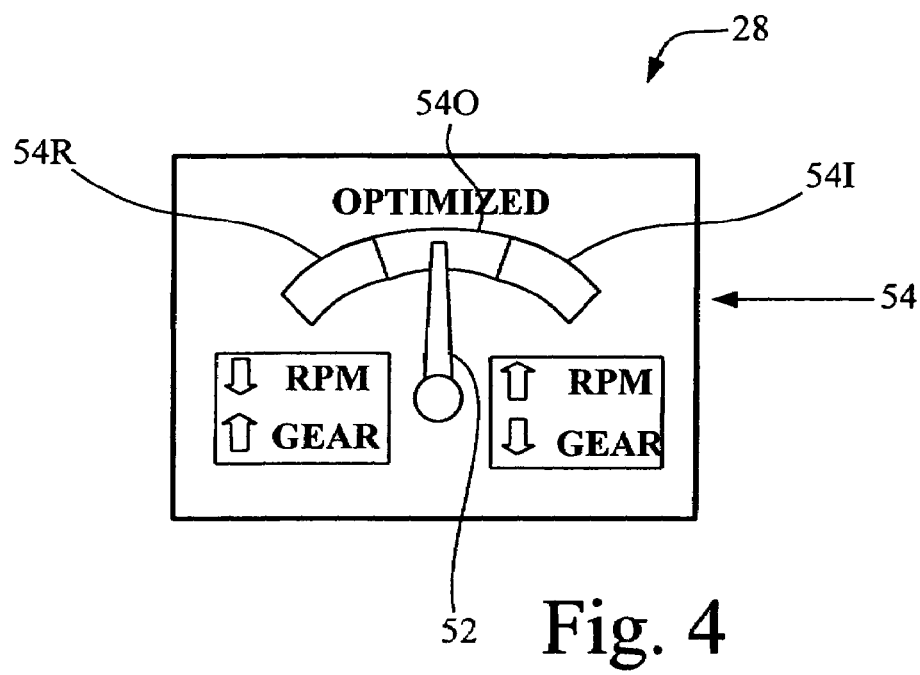
FIG. 4 is a graphical representation of an operator display employed in conjunction with an embodiment of the present invention.

For example, referring now to FIG. 4, an embodiment of operator display 28 is depicted. Operator display 28 includes an indicator 52 in the form of a gage needle, and a control range 54 subdivided into regions 54O, 54I, and 54R. Indicator 54 is controlled by the control signal generated in step S114. When indicator 52 lies in region 54O, engine 14 is considered to be operating at an optimized operating point. When indicator 52 lies in region 54I, this indicates that engine 14 is not operating at an optimized operating point, and an engine 14 RPM should be increased by increasing the engine 14 throttle setting and/or reducing the gear ratio of transmission 16. When indicator 52 lies in region 54R, this indicates that engine 14 is not operating at an optimized operating point, and an engine 14 RPM should be decreased by reducing the engine 14 throttle setting and/or increasing the gear ratio of transmission 16.

Figure 5:
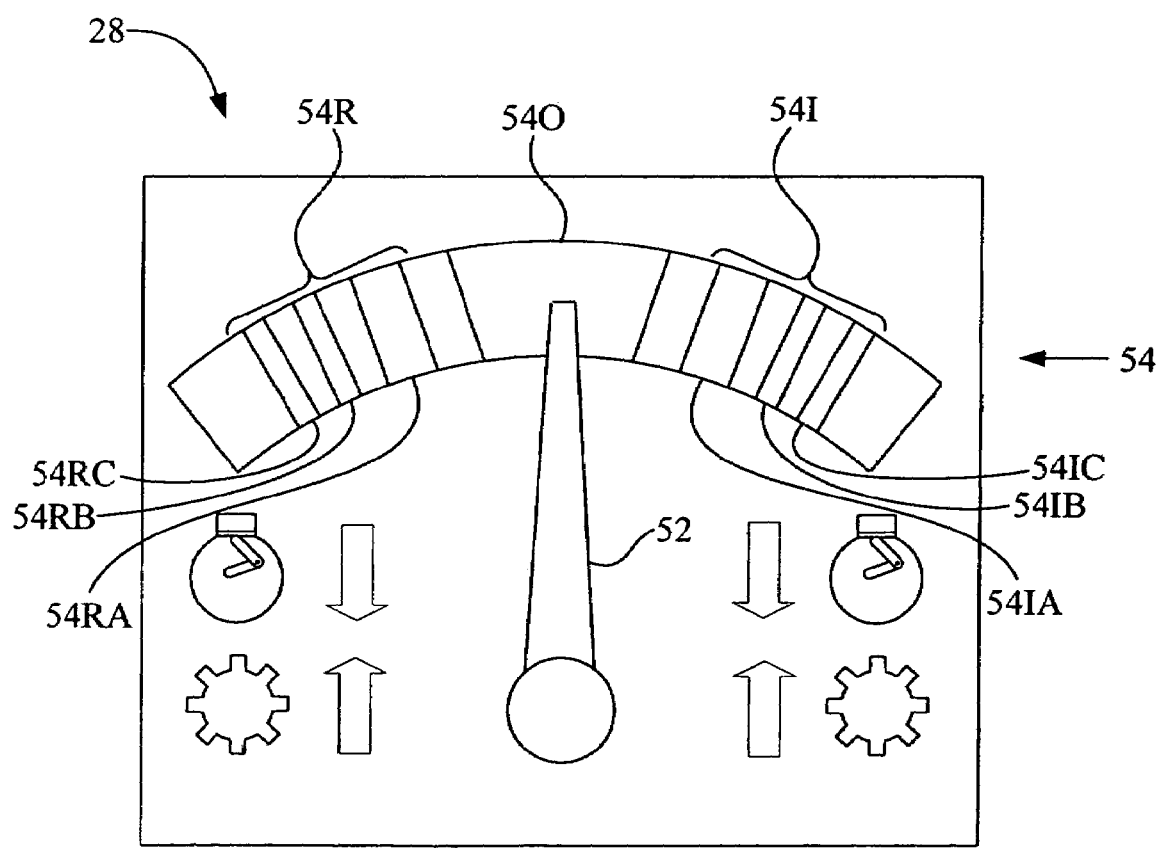
FIG. 5 is another graphical representation of an operator display employed in conjunction with an embodiment of the present invention.

Referring now to FIG. 5, another embodiment of operator display 28 is depicted. When indicator 52 lies in region 54O, engine 14 is considered to be operating at an optimized operating point. When indicator 52 lies in region 54I, this indicates that engine 14 is not operating at an optimized operating point, and an engine 14 RPM should be increased, similarly as that set forth with respect to the embodiment of FIG. 4. However, in the embodiment of FIG. 5, region 54I is subdivided into a range of subregions 54IA, 54IB, and 54IC, which are indicative of the range of magnitude of increase of engine 14 speed required to reach an optimized operating point. For example, indicator 52 lying in subregion 54IC may indicate a more substantial magnitude of increase of engine 14 speed than if indicator 52 were lying subregion 54IB, which may indicate a more substantial magnitude of change than if indicator 52 were lying in subregion 54IA. Similarly, when indicator 52 lies in region 54R, this indicates that engine 14 is not operating at an optimized operating point, and an engine 14 RPM should be is decreased, similarly as that set forth above with respect to the embodiment of FIG. 4. Region 54R is subdivided into a range of subregions 54RA, 54RB, and 54RC, which are indicative of the range of magnitude of change of engine 14 speed required to reach an optimized operating point. For example, indicator 52 lying in subregion 54IC may indicate a more substantial reduction of engine 14 speed than if indicator 52 were lying subregion 54IB, which may indicate a more substantial reduction of engine 14 speed than if indicator 52 were lying in subregion 54IA.

Referring again to FIG. 3, an example of an application of the present invention is illustrated. If operating point 56 is deemed the current operating point of engine 14 during use of machine 10, and the reserve power need of machine 10 is determined to be 70 kW, it is apparent that the available reserve power of engine 14 at operating point 56, i.e., the difference between the maximum power output of engine 14 at the operating point 56 engine 14 speed and the current power output of engine 14 at operating point 56, is not sufficient to meet the reserve power need. In such a case, the output value and corresponding control signal would indicate a required engine 14 speed change (increase) to reach operating point 46, which is an optimized operating point because it satisfies both the reserve power need of machine 10, and also has optimal fuel economy at the required power output of engine 14, as indicated by the lines of constant BSFC 50 of fuel economy map 40.

Another example of an application of the present invention is illustrated as follows. If operating point 58 is deemed the current operating point of engine 14 during use of machine 10, and the reserve power need of machine 10 is determined to be 80 kW, it is apparent that the available reserve power of engine 14 at operating point 56 is sufficient to meet the reserve power need. However, as indicated by the lines of constant BSFC 50 of fuel economy map 40, the fuel economy is not optimal. In such a case, the output value and corresponding control signal would indicate a required engine 14 speed change (decrease) to reach operating point 44, which is an optimized operating point because it satisfies both the reserve power need of machine 10, and also has optimal fuel economy at the required power output of engine 14, as indicated by the lines of constant BSFC 50 of fuel economy map 40.

The present embodiment has been described with respect to a reserve need of machine 10 for a particular job application of machine 10, such as a particular job task or the use of a particular attached implement, or a combination thereof. It may be desirable to determine a reserve need for another application of machine 10, e.g., another job task or implement or combination thereof. Accordingly, other embodiments of the present invention include determining a second or subsequent reserve need associated with machine 10, the second or subsequent reserve need pertaining to a second or subsequent particular job application of machine 10, wherein the initial reserve need determined in the initial application of step S102 is a first reserve need pertaining to a first particular job application of machine 10.

Such embodiments also include repeating steps S106 to S114 to yield a second or subsequent output value for each operating point pertaining to the second or subsequent particular job application of machine 10, wherein the acceptable reserve in the repeated application of steps S106–S114 is an available reserve that satisfies the second or subsequent reserve need, and wherein the initial output value defined in the first application of step S110 is a first output value pertaining to the first particular job application of machine 10. Implementations of such embodiments may include storing both the initial and second and subsequent output values in control unit 26.

Figure 6A:
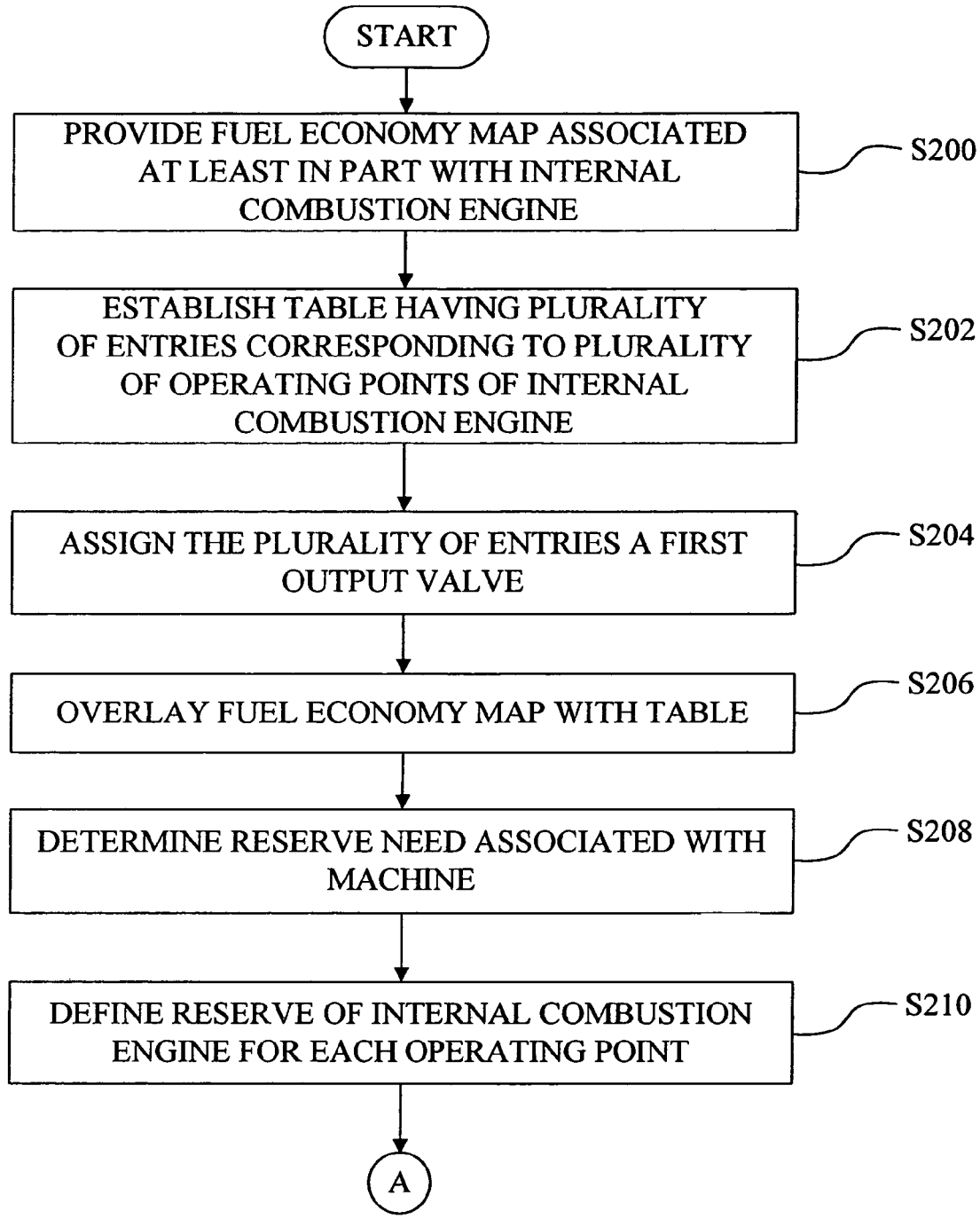
FIGS. 6A and 6B are a flowchart depicting a method for optimizing fuel consumption in a machine powered by an internal combustion engine in accordance with another embodiment of the present invention.
Figure 6B:
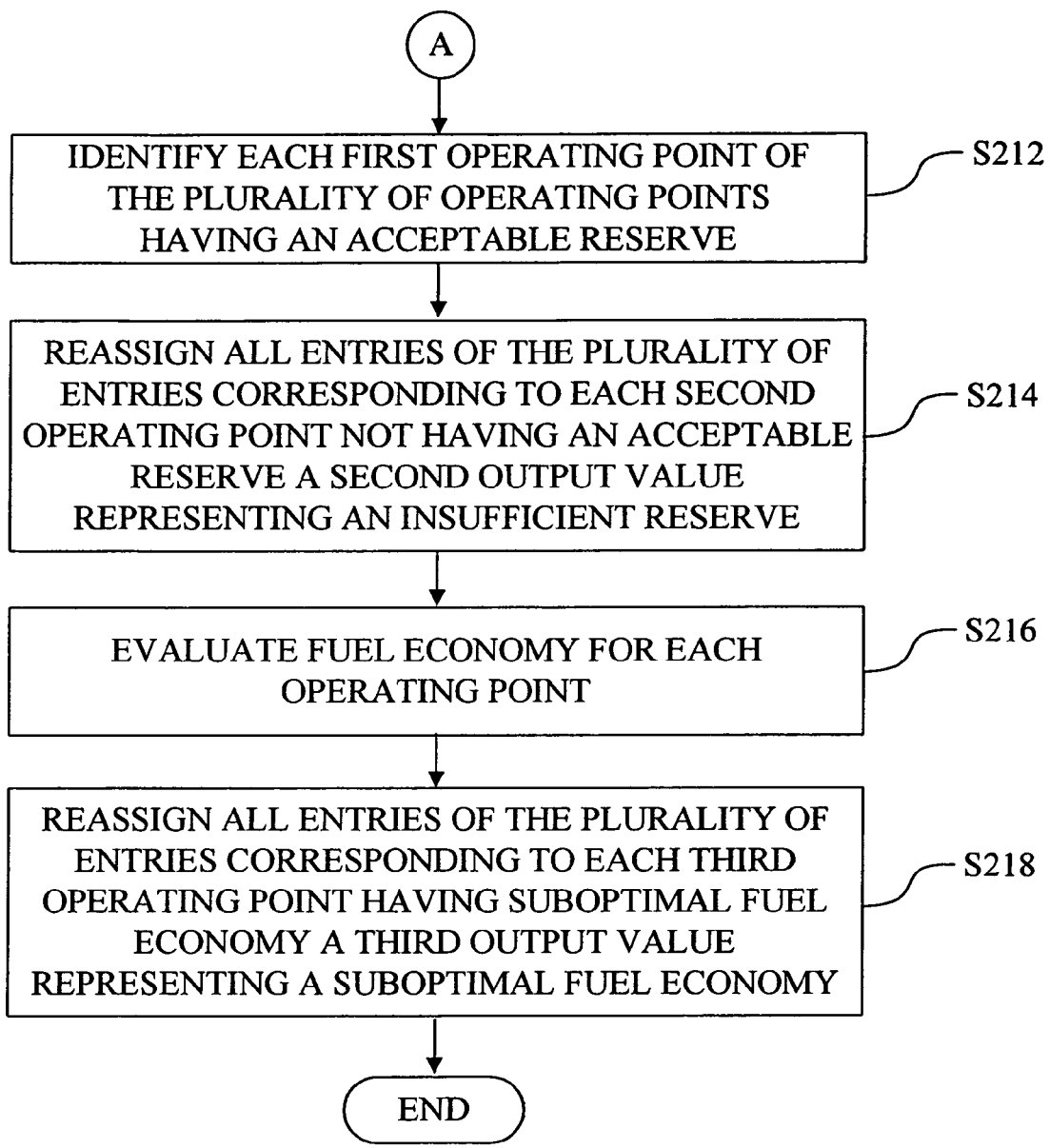

Referring now to FIG. 6, a method for optimizing fuel consumption in a machine, such as machine 10, powered by an internal combustion engine, such as engine 14, in accordance with another embodiment of the present invention is depicted in the form of a flowchart.

At step S200, fuel economy map 40 associated at least in part with engine 14 is provided. Fuel economy map 40 defines the fuel economy at plurality of operating points 42 of engine 14.

At step S202, an optimizer table 60 having a plurality of entries 62 corresponding to plurality of operating points 42 is established.

As generally set forth in the previous embodiment, mapping data of the operating envelope of an engine 14 application, e.g., in the form of a fuel economy map such as fuel economy map 40, will provide the maximum power output at a given engine speed and the BSFC for a given speed and load. In the present embodiment, this data is used to establish a look-up table, optimizer table 60, depicted in FIG. 7. The output values are on a relative scale of 1–5. A level of 1 represents poor fuel economy, 5 represents poor reserve power, and 3 represents the best combination of both. Optimizer table 60 may be based on vehicle or engine BSFC. In the present embodiment, optimizer is based on vehicle BSFC. The output of optimizer table 60 is ultimately employed to operate operator display 28 for the operator to view.

In the present embodiment, optimizer table 60 is generated manually, although it is alternatively contemplated that optimizer table 60 may be generated using a computer algorithm. Engine speed and engine (or vehicle) power are inputs to optimizer table 60, and the relative 'optimization' level is given as the output values.

Figure 7:
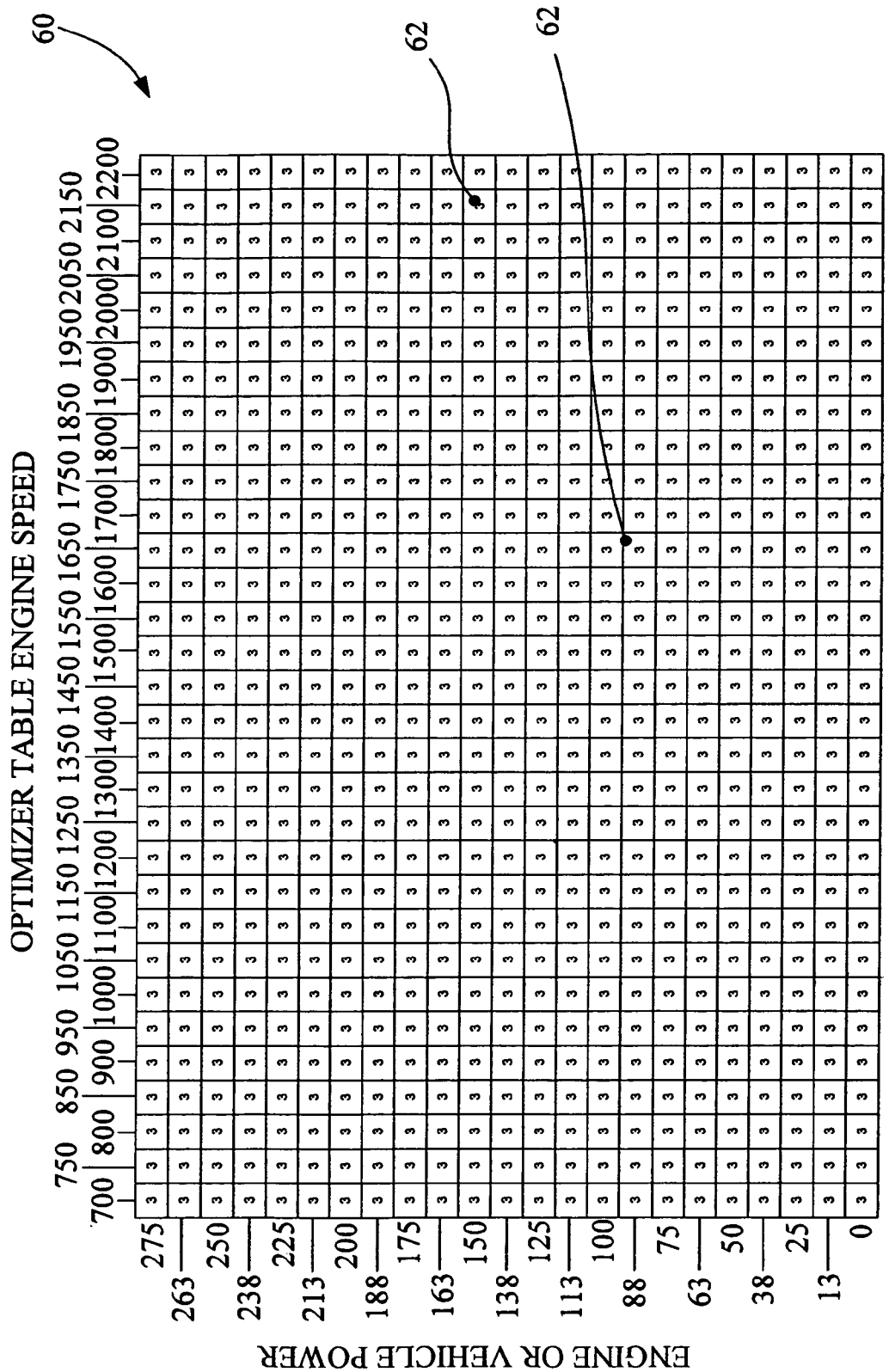
FIG. 7 is an initial optimizer table employed in accordance with an embodiment of the present invention.

At step S204, plurality of entries 62 are assigned a first output value. In the present embodiment, an output value of 3 is assigned to plurality of entries 62, i.e., the entire operating region of engine 14. A representation of optimizer table 60 after completion of step S204 is depicted in FIG. 7.

At step S206, fuel economy map 40 is overlaid with optimizer table 60.

At step S208, a reserve need associated with machine 10 is determined. In the present embodiment, the reserve need is a reserve power need, e.g., for implements powered via shaft power. In another embodiment, the reserve need is a reserve engine 14 speed need, e.g., for hydraulically actuated implements powered by machine 10.

At step S210, an available reserve of engine 14 is determined for each operating point of plurality of operating points 42. For embodiments where the reserve need is a reserve power need, such as the present embodiment, the available reserve is an available reserve power of engine 14. Conversely, for embodiments where the reserve need is a reserve engine 14 speed need, the available reserve is an available reserve engine 14 speed capability. For embodiments where the reserve need is a combination of a reserve engine 14 power need and a reserve engine 14 speed need, the available reserve is an available reserve power of engine 14 in combination with an available reserve engine 14 speed capability.

At step S212, each first operating point of plurality of operating points 42 having an acceptable reserve is identified, the acceptable reserve being the available reserve at each operating point that satisfies the reserve need.

For embodiments where the reserve need is a reserve power need the acceptable reserve is available reserve power that satisfies the reserve power need. Conversely, for embodiments where the reserve need is a reserve engine 14 speed need, the acceptable reserve is the available reserve engine speed that satisfies the reserve engine speed need.

At step S214, all entries of plurality of entries 62 corresponding to each second operating point not having an acceptable reserve are assigned a second output value representing an insufficient reserve, as set forth below.

Figure 8:
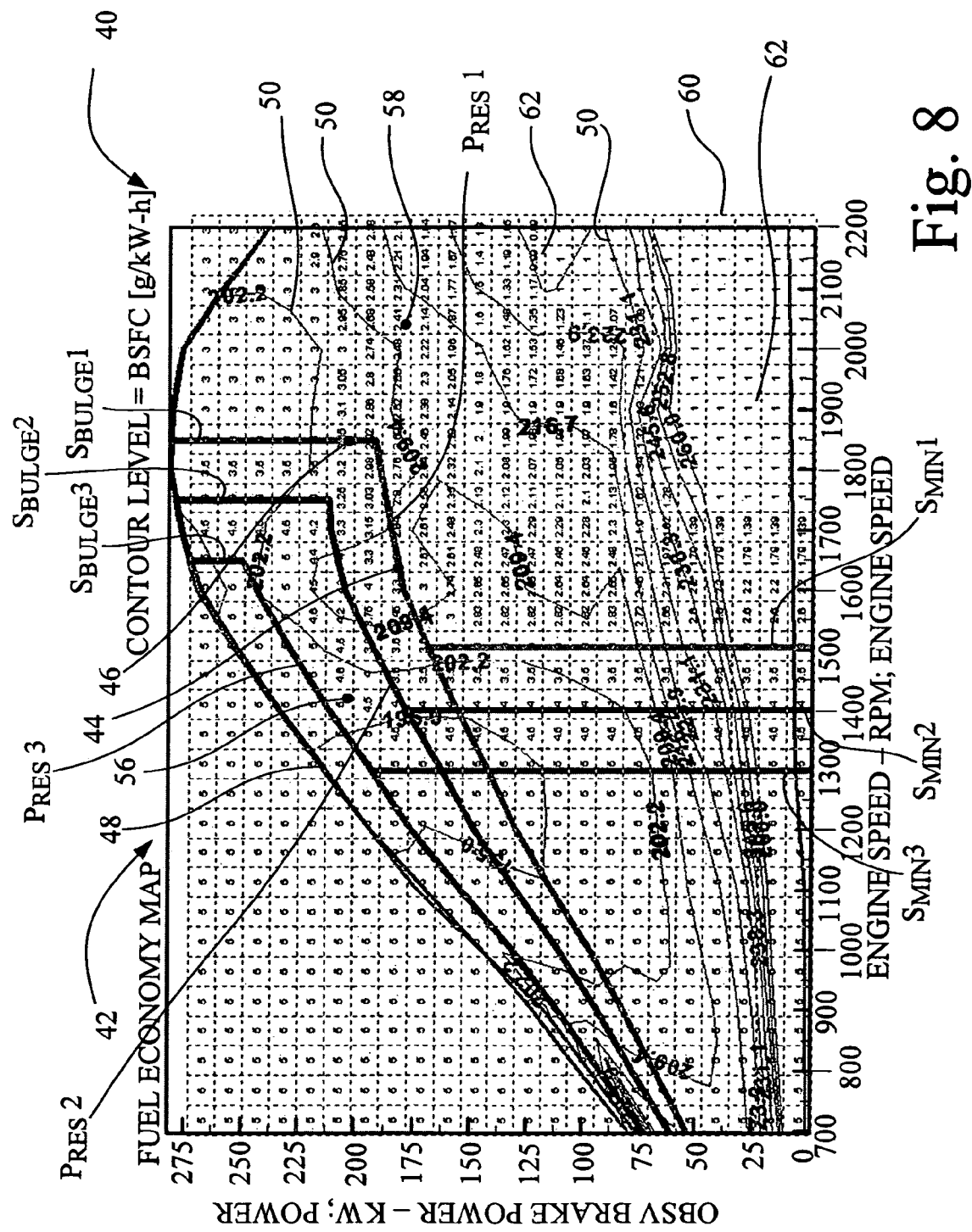
FIG. 8 is a graphical representation of a fuel economy map overlaid with an optimizer table in accordance with the embodiment of FIG. 7.

For each of plurality of entries 62, for those entries where a definable amount of available reserve power that meets or exceeds the reserve power need, $P_{res1}$, is available at a given engine speed, optimizer table 60 output values remain 3. At a reserve power level of $P_{res2}$ for a given engine 14 speed, i.e., operating points that are nominally insufficient in terms of available reserve power, the table output is 4, and at a power level of $P_{res}3$ and less, i.e., operating points that are substantially insufficient in terms of available reserve power, the output is be a 5. Output values may be linearly interpolated between the above defined values to provide a continuous transition. Although defined in terms of a constant power reserve percentage in the present embodiment, without regard to engine 14 speed, it is alternatively contemplated that, $P_{res1}$, $P_{res2}$, and $P_{res3}$ may be defined as varying as a function of engine 14 speed. $P_{res1}$, $P_{res2}$, and $P_{res3}$ are depicted in FIG. 8.

In addition to the above criteria, the following will be layered onto the map to prevent the supply of negative feedback based on insufficient reserve power when running at speeds at and above the peak power speed. For example, in some types of engine 14, peak power is at a lower RPM than maximum rated engine speed, and at "bulge speeds" ($S_{bulge}$), which are speeds are above peak power speed, a reduction in engine 14 speed results in a "power bulge," which may be desirable for an operator. For all optimizer table 60 entries set to a value greater than 3 and at speeds above peak power minus $S_{bulge1}$ RPM, the maximum output value is limited to 3; at $S_{bulge2}$ RPM below peak power, the maximum table output is limited to 4; at $S_{bulge3}$ RPM below peak power, the maximum table output is limited to 5. The maximum allowable output may be interpolated between the above defined lines. Although defined as lines of constant engine 14 speed in the present embodiment, it is alternatively contemplated that $S_{bulge1}$, $S_{bulge2}$, and $S_{bulge3}$ may be defined as varying as a function of power of engine 14. $S_{bulge1}$, $S_{bulge2}$, and $S_{bulge3}$ are depicted in FIG. 8.

Various engine performance or durability criteria may dictate that the engine speed be maintained above a minimum engine speed. To encourage operators to maintain a minimum engine speed, the following is applied in the present embodiment. At the minimum desirable engine speed, $S_{min1}$, the output value remains at 3. At the minimum speed minus a defined RPM, $S_{min2}$, the output value is set to 4. At the minimum speed minus a second defined RPM and slower, $S_{min3}$, the table output is set to 5. Although defined in terms of lines of constant engine 14 speed in the present embodiment, it is alternatively contemplated that $S_{min1}$, $S_{min2}$, and $S_{min3}$ may be defined as varying as a function of power of engine 14, if desired. $S_{min1}$, $S_{min2}$, and $S_{min3}$ are depicted in FIG. 8. Output values may be linearly interpolated between the above defined values to provide a continuous transition.

At step S216, fuel economy is evaluated for each operating point. In the present embodiment, lines of constant power will be evaluated one at a time. Only the region of optimizer table 60 that has a current output value of 3 at the present point in the construction of optimizer table 60 will be evaluated for BSFC. This prevents operating points with insufficient reserve power from being defined as the best condition to run at with respect to BSFC. The minimum BSFC for each power level shall be identified by starting at the highest engine speed and working to the lowest possible engine speeds that still has an output value of 3 on optimizer table 60. If when working from the fastest engine speed to the slowest, a local minimum BSFC is encountered and then the BSFC trend moves upward and over a predefined threshold, B1%, then that local minimum BSFC will be used. This insures that the system will have one unique optimal solution at every power level. If there is not more than a predefined minimum amount of BSFC variation, Bmin, at a given power level, then the output for the entire power level remains at 3. Threshold B1% and Bmin may be determined empirically.

At step S218, all entries of plurality of entries 62 corresponding to each third operating point having suboptimal fuel economy are reassigned a third output value representing a suboptimal fuel economy.

Once the minimum BSFC is found for a given constant power level, optimizer table 60 is then reassigned new output values at that power level based on the following criteria. For engine speeds faster than the speed where the minimum BSFC occurs at this power level, the Table output shall be the minimum of a) the value that would result from decreasing the output value by 1 for every B2% increase in BSFC with a minimum value of 1, or b) the lowest table value occurring between the speed that the minimum BSFC occurs at and the current engine speed being evaluated. The value of B2% may be determined empirically.

If the engine speed being evaluated is slower than the engine speed of the minimum BSFC for that power, then the table output shall be the maximum of a) the current table value, b) the value that would result from increasing the output value by 1 for every B2% increase in BSFC, or c) the highest table value occurring between the speed that the minimum BSFC occurs at and the current engine speed being evaluated. Once again, this insures that the system will have one unique optimal solution for every power level.

Step S218 is performed at every power level within the power envelope of the application of machine 10 in power increments defined by needs of the application. The output values defined in optimizer table 60 may be interpolated to obtain additional data for operating points lying therebetween.

In the present embodiment, an optimized operating point is one corresponding to an output value of 3, whereas values greater than 3 represent those operating points having progressively less sufficient reserve power, while values less than 3 represent those points having progressively less optimal fuel economy. The particular values associated with optimized operating points (first output values), operating points deficient in reserve power (second output values), and operating points having suobtimal fuel economy (third output values) are exemplary only. Any first output value that lies between the second output value and the third output value on a linear scale may be employed without departing from the scope of the present invention. As set forth above, in the present embodiment, the second output value is proportional to an extent by which insufficient reserve is insufficient to meet the reserve need, and the third output value is proportional to an extent by which the suboptimal fuel economy is suboptimal.

Referring now to FIG. 8, fuel economy map 40 as overlaid with a completed optimizer table 60 is depicted.

Figure 9:
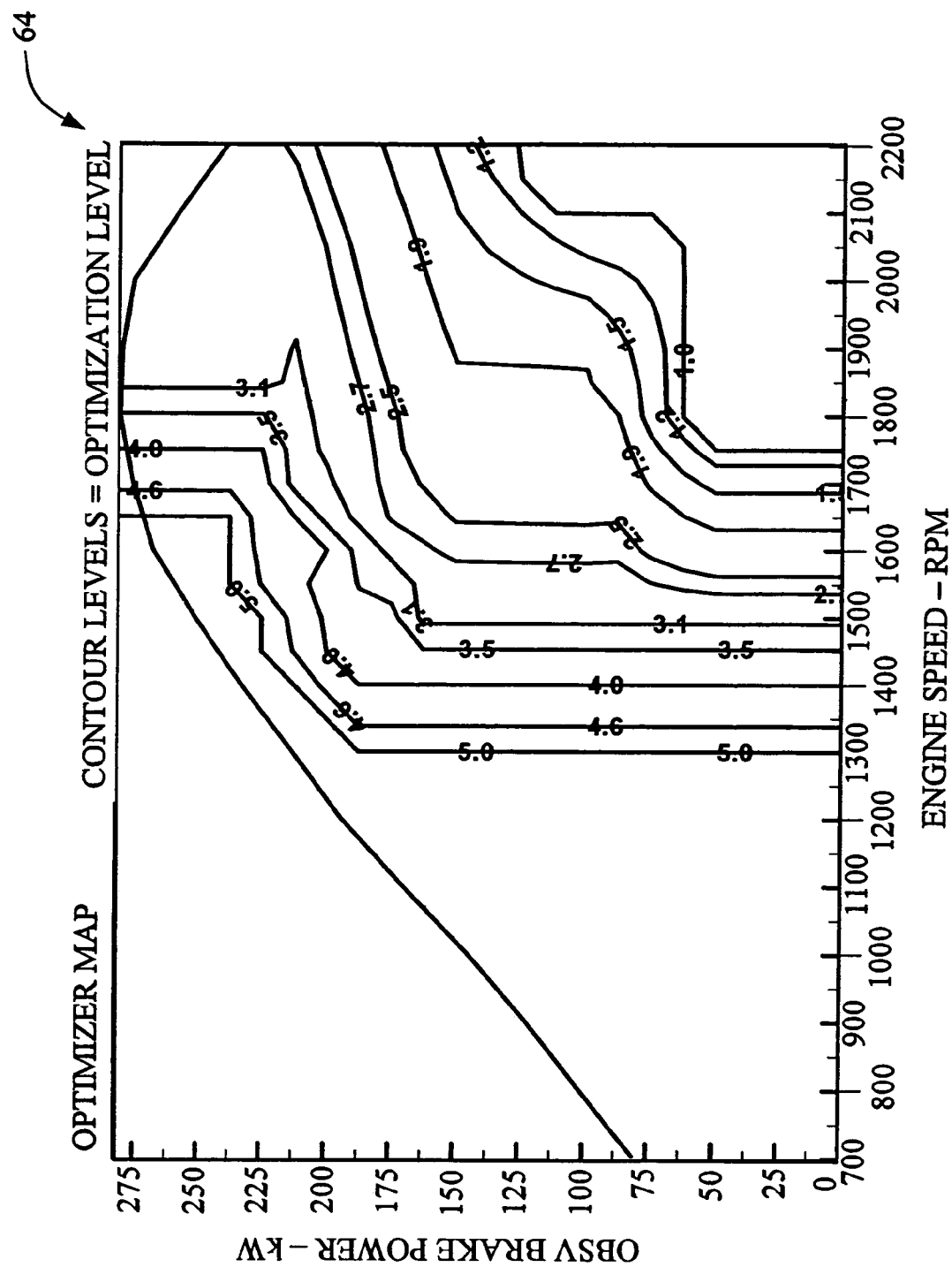
FIG. 9 is a graphical representation of an optimizer map constructed in accordance with the embodiment of FIG. 7.

Referring now to FIG. 9, another graphical representation of the output of optimizer table 60 is depicted in the form of an optimizer map 64, illustrating lines of constant optimizer table 60 output value on a plot of BSFC against engine 14 speed.

Similar to the embodiment described with respect to steps S100–S114, during operation of machine 10, control unit 26 executes programmed instructions to determine a current operating point of engine 14, and also to select an entry from plurality of entries 62 corresponding to the current operating point, and generate a control signal for controlling engine 14 using one of the first output value, the second output value, and the third output value as which corresponds to the entry.

The output of optimizer table 60 may be employed to drive a gauge at the operator console to give the operator feedback on how the engine is performing and the ability to adjust the operating condition to be more fuel efficient. An output level of 3 from the Optimizer Table corresponds to the center of the range of the operator display 28, which is depicted in FIGS. 4 and 5 as region 54O. An output level of 1 corresponds to the farthest left region, i.e., region 54R, and an output level of 5 corresponds to the farthest right region, i.e., region 54I. As depicted in FIGS. 4 and 5, text or symbols may appear on the display that will instruct the operator as to what engine 14 and/or transmission 16 changes are necessary to run at the optimized condition.

During operation, the memory device of control unit 26 stores optimizer table 60, and engine 14 speed and either machine 10 or engine 14 power are provided as inputs to the table. The electronic control unit uses the inputs to look up the output value of optimizer table 60. This output may be filtered electronically with an appropriate time constant to stabilize the display and then converted to the appropriate kind of signal to drive operator display 28.

Yet another embodiment of the present invention may be employed where the operator of machine 10 does not have the ability to vary engine 14 speed, but can vary the power requirements of the application through some sort of adjustment to the system.

In the previous embodiment, each operating point of engine 14 are evaluated. However, in the present embodiment, plurality of operating points 42 are defined as being only those operating points at which engine 14 is configured to operate in the particular machine 10. Hence, BSFC analysis is conducted along the possible speed/power combinations available to the system. Otherwise, the present embodiment is similar to that described with respect to steps S200 to S218, and hence, steps S200–S218 apply equally to the present embodiment.

The present embodiment may be employed for use with an application that runs at wide open throttle and therefore operates only on a torque and governor curve.

Figure 10:
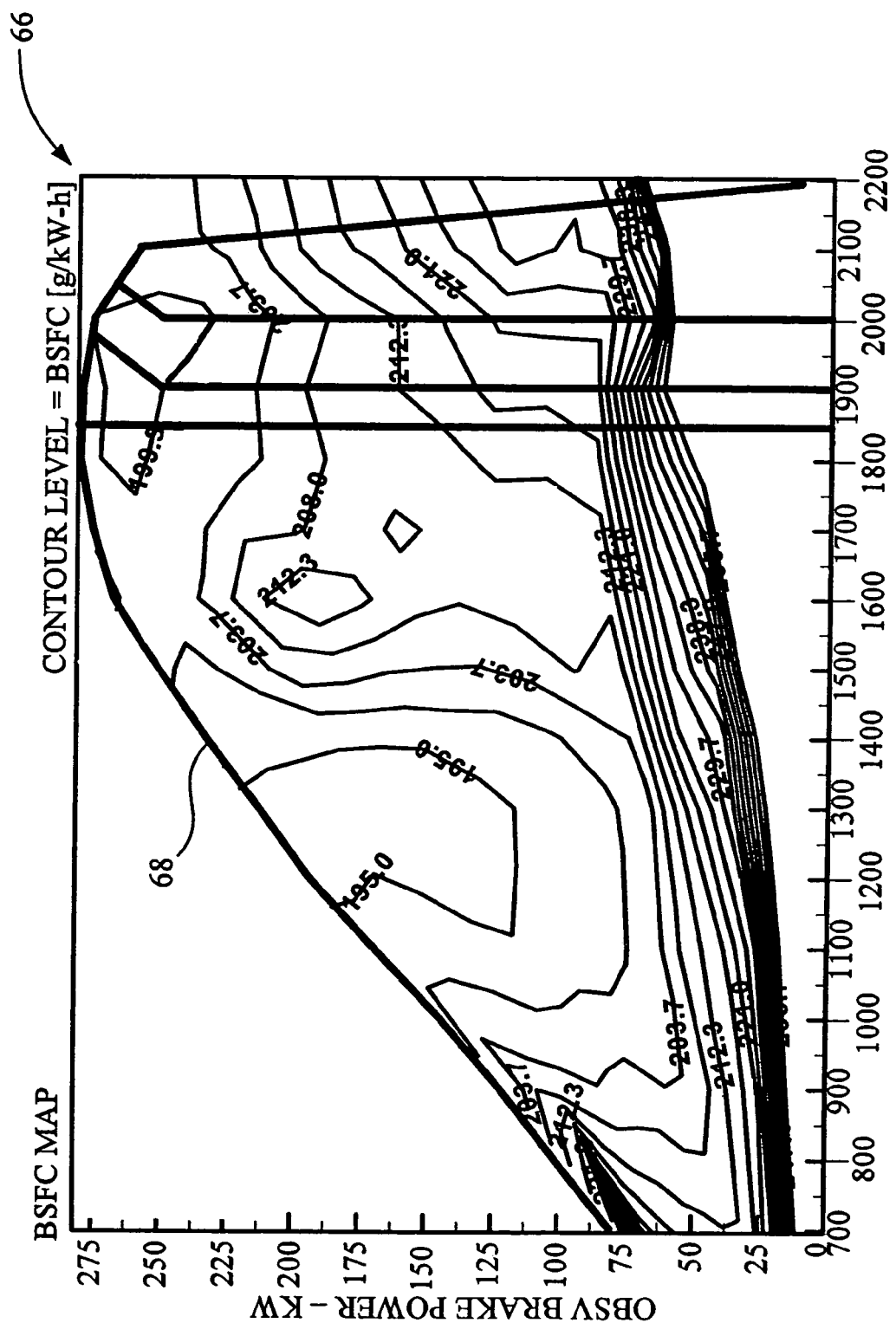
FIG. 10 is a graphical representation of another fuel economy map employed in accordance with an embodiment of the present invention.

Referring now to FIG. 10, a fuel economy map 66 employed in accordance with the present embodiment is depicted, which illustrates a torque and governor curve 68. The points along this torque and governor curve 68 that meet the reserve power requirements for the particular application of machine 10 are evaluated to find the minimum BSFC on torque and governor curve 68.

Once the minimum BSFC is found, optimizer table 60 is then reassigned new output values based on the following criteria. For power levels less than that where the minimum BSFC occurs, the table output shall be the minimum of a) the value that would result from decreasing the output value by 1 for every B2% increase in BSFC with a minimum value of 1, or b) the lowest table value occurring between the power level that the minimum BSFC occurs at and the current power level being evaluated. This output value is used to populate optimizer table 60 across all of the engine 14 speeds at the current power level being evaluated that still have an output value of 3. Engine speeds in optimizer table 60 at this power level with values greater than 3 shall remain at that value.

If the power level being evaluated is higher than the power level of the minimum BSFC, then the output value is defined as the maximum of a) the current optimizer table value, b) the value that would result from increasing the output value by 1 for every B2% increase in BSFC, or c) the highest table value occurring between the speed that the minimum BSFC occurs at and the current engine speed being evaluated. The rest of the engine speeds at this power level will be populated with the maximum of a) the current optimizer table 60 value, or b) the value generated as set forth previously.

Referring now to FIG. 11, optimizer map 64, as constructed in accordance with the present embodiment, is depicted.

Having described preferred embodiments, it will become apparent that various modifications can be made without departing from the scope of the invention as defined in the accompanying claims.

The invention claimed is:

1. A method for optimizing fuel consumption in a machine powered by an internal combustion engine, comprising:
   providing a fuel economy map associated at least in part with said internal combustion engine, said fuel economy map defining a fuel economy at a plurality of operating points of said internal combustion engine;
   determining a reserve need associated with said machine;
   determining an available reserve of said internal combustion engine for said plurality of operating points;
   identifying each operating point of said plurality of operating points having an acceptable reserve, said acceptable reserve being said available reserve that satisfies said reserve need;
   evaluating said fuel economy for said each operating point; and
   defining an output value for said each operating point based on said fuel economy and said acceptable reserve.

2. The method of claim 1, wherein said acceptable reserve is a range of reserve values, and wherein said output value varies based on a location of said each operating point within said range of reserve values and on said fuel economy.

3. The method of claim 1, wherein during operation of said machine, further comprising:
   determining a current operating point of said internal combustion engine; and
   generating a control signal for controlling said internal combustion engine using said output value corresponding to said current operating point.

4. The method of claim 3, wherein said control signal is configured to operate said internal combustion engine at a minimum specific fuel consumption while maintaining said acceptable reserve.

5. The method of claim 3, further comprising using said control signal to prompt an operator of said machine to change said current operating point.

6. The method of claim 3, said machine including a transmission coupled to said internal combustion engine, further comprising generating said control signal for controlling said transmission using said output value corresponding to said current operating point.

7. The method of claim 6, further comprising using said control signal to control said internal combustion engine and said transmission to change said current operating point.

8. The method of claim 1, further comprising:
determining parasitic power losses associated with said machine; and
incorporating said parasitic power losses into said fuel economy map to thereby associate said fuel economy map at least in part with said machine, said fuel economy map defining said fuel economy at said plurality of operating points of said internal combustion engine while operating in said machine.

9. The method of claim 1, said machine including a control unit, further comprising storing said output value for said each operating point in said control unit.

10. The method of claim 9, wherein during operation of said machine, further comprising said control unit executing programmed instructions to:
determine a current operating point of said internal combustion engine; and
generate a control signal for controlling said internal combustion engine using said output value corresponding to said current operating point.

11. The method of claim 1, further comprising:
determining a second reserve need associated with said machine, said second reserve need pertaining to a second particular job application of said machine, wherein said reserve need is a first reserve need pertaining to a first particular job application of said machine; and
repeating said identifying said each operating point, said evaluating said fuel economy, and defining an output value based on said second reserve need to yield a second output value for said each operating point pertaining to said second particular job application of said machine,
wherein said acceptable reserve is said available reserve that satisfies said second reserve need, and said output value is a first output value pertaining to said first particular job application of said machine.

12. The method of claim 11, said machine including a control unit, further comprising storing said first output value for said each operating point in said control unit and storing said second output value for said each operating point.

13. The method of claim 1, wherein said reserve need is a reserve power need, wherein said available reserve is an available reserve power of said internal combustion engine at said each operating point, and wherein said acceptable reserve is said available reserve power that satisfies said reserve power need.

14. The method of claim 1, wherein said reserve need is a reserve engine speed need, wherein said available reserve is an available reserve engine speed of said internal combustion engine at said each operating point, and wherein said acceptable reserve is said available reserve engine speed that satisfies said reserve engine speed need.

15. The method of claim 1, wherein said plurality of operating points are only those operating points at which said internal combustion engine is configured to operate in said machine.

16. A method for optimizing fuel consumption in a machine powered by an internal combustion engine, comprising:
providing a fuel economy map associated at least in part with said internal combustion engine, said fuel economy map defining a fuel economy at a plurality of operating points of said internal combustion engine;
establishing a table having a plurality of entries corresponding to said plurality of operating points;
assigning said plurality of entries a first output value;
overlaying said fuel economy map with said table;
determining a reserve need associated with said machine;
determining an available reserve of said internal combustion engine for each operating point of said plurality of operating points;
identifying each first operating point of said plurality of operating points having an acceptable reserve, said acceptable reserve being said available reserve that satisfies said reserve need;
reassigning all entries of said plurality of entries corresponding to each second operating point not having said acceptable reserve a second output value representing an insufficient reserve;
evaluating said fuel economy for said each operating point; and
reassigning all entries of said plurality of entries corresponding to each third operating point having suboptimal fuel economy a third output value representing a suboptimal fuel economy.

17. The method of claim 16, wherein said first output value lies between said second output value and said third output value on a linear scale.

18. The method of claim 16, wherein said plurality of operating points are only those operating points at which said internal combustion engine is configured to operate in said machine.

19. The method of claim 16, wherein said second output value is proportional to an extent by which said insufficient reserve is insufficient.

20. The method of claim 16, wherein said third output value is proportional to an extent by which said suboptimal fuel economy is suboptimal.

21. The method of claim 16, wherein said reserve need is a reserve power need, wherein said available reserve is an available reserve power of said internal combustion engine at said each operating point, and wherein said acceptable reserve is said available reserve power that satisfies said reserve power need.

22. The method of claim 16, wherein said reserve need is a reserve engine speed need, wherein said available reserve is an available reserve engine speed of said internal combustion engine at said each operating point, and wherein said acceptable reserve is said available reserve engine speed that satisfies said reserve engine speed need.

23. The method of claim 16, said machine further including a control unit, wherein during operation of said machine, further comprising said control unit executing programmed instructions to:
determine a current operating point of said internal combustion engine;
select an entry of said plurality of entries corresponding to said current operating point; and
generate a control signal for controlling said internal combustion engine using one of said first output value, said second output value, and said third output value as corresponds to said entry.

24. A method of operating a work machine powered by an internal combustion engine, comprising:
determining a reserve need associated with said machine;
determining a current operating point of said internal combustion engine; and
generating a control signal for controlling said internal combustion engine based on a fuel economy and an available reserve of said internal combustion engine that satisfies said reserve need.

25. The method of claim 24, said machine including a transmission coupled to said internal combustion engine for outputting power from said machine, further comprising generating said control signal for controlling a gear ratio of said transmission based on said fuel economy and said available reserve of said internal combustion engine that satisfies said reserve need.

26. A method of operating an internal combustion engine powering a work machine, comprising:

providing an operator display having an indicator;

determining a current operating point of said internal combustion engine;

generating a control signal for controlling said internal combustion engine based on a fuel economy and an available reserve of said internal combustion engine relative to said current operating point; and controlling said indicator using said control signal to visibly indicate to an operator of said machine a change of operating speed of said internal combustion engine necessary to improve at least one of said fuel economy and said available reserve, wherein said indicator indicates one of said engine speed being optimized, said engine speed should be increased, and said engine speed should be decreased.

27. The method of claim 26, further comprising configuring said operator display to visibly indicate to said operator a magnitude of said change of said operating speed.

28. The method of claim 26, said machine including a transmission coupled to said internal combustion engine for outputting power from said machine, further comprising:

generating said control signal for controlling said transmission based on a fuel economy and an available reserve of said internal combustion engine relative to said current operating point; and controlling said indicator using said control signal to visibly indicate to said operator a change of gear ratio of said transmission necessary to improve said at least one of said fuel economy and said available reserve.

* * * * *